June 26, 1956  J. M. SCOTT  2,751,950

DEFLECTING SHIELD FOR MEAT GRINDERS

Filed March 30, 1953

INVENTOR.
Jack M. Scott
BY
ATTORNEY

United States Patent Office 2,751,950
Patented June 26, 1956

2,751,950

DEFLECTING SHIELD FOR MEAT GRINDERS

Jack M. Scott, Dallas, Tex.

Application March 30, 1953, Serial No. 345,505

3 Claims. (Cl. 146—182)

This invention relates to shields and more particularly to a shield for meat grinding machines.

Motor-driven meat grinders are in wide use in butcher shops and other establishments which handle large quantities of meat. It is found that such grinders often eject the ground-up meat with considerable force and velocity so that the meat is thrown past the receptacle disposed below the outlet opening of the meat grinder, and against walls or other objects which may be disposed in the path of movement of the ground-up meat to fall eventually upon the floor of the establishment. Particles of the meat may cling to the walls or other objects so that both the floor and such walls or objects must be cleaned after each use of the grinder if sanitary conditions are to be maintained in the establishment. The ground-up meat which is thrown past the receptacle becomes contaminated and cannot be used. It is desirable, therefore, to provide a shield for such meat grinders which will deflect the ground-up meat into the receptacle, thus effecting considerable savings by eliminating the need for cleaning walls, floors and other objects after each use of the meat grinders, and by preventing the loss of meat which otherwise would be thrown past the receptacle to contact unsanitary surfaces. The shield should be easily attachable to the grinding machine so that it may easily be secured to the grinding machine when needed and also easily detached from the machine for cleaning or to facilitate removal or change of the knives of the machine. The shield should also be easily movable between an operative position wherein it deflects the ground-up meat ejected by the machine into a receptacle and an inoperative position wherein it does not obstruct the outlet opening of the machine, in order to facilitate cleaning of the machine or removal or change of the knives of the machine.

Accordingly, an object of the invention is to provide a new and improved shield for grinding machines for deflecting into a receptacle meat ejected by the machines.

Another object of the invention is to provide a new and improved shield for grinding machines which is detachably secured to the machine whereby the cleaning of the shield and of the machine is facilitated.

Still another object of the invention is to provide a new and improved shield for grinding machines which is adjustably mounted on the machine for movement between an operative position wherein the shield deflects meat ejected by the machine from the outlet thereof and an inoperative position wherein the shield does not obstruct the outlet opening of the machine.

A further object of the invention is to provide a shield, of the type described above, which is of simple, economical construction.

Additional objects and advantages of the invention will readily be apparent from the reading of the following description of devices constructed in accordance with the invention, and reference to the accompanying drawings thereof, wherein.

Figure 1:
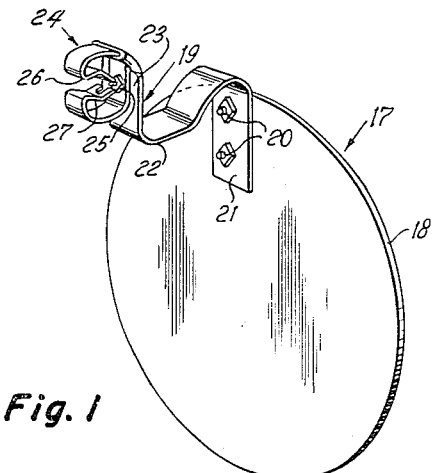
Figure 1 is an enlarged perspective view of the shield.

Referring now to the drawing, the numeral 10 designates a conventional meat grinding machine having a barrel 11 in which is disposed a rotatable screw for forcing meat through knives (not shown) and out of the outlet end 12 of the barrel. A ring 13 of considerably greater diameter than the barrel is secured to the barrel by spaced rearwardly and outwardly extending bars 14 which may be integral with the ring and the barrel. The grinding machine is also provided with an electric motor 15 for rotating the screw in the barrel, and with a pan 16 provided with an inlet opening (not shown) through which meat which is to be ground up is fed into the barrel 11. These elements of the grinding machine are conventional and will not, therefore, be described in greater detail.

The shield 17 for use on the grinding machine 10 includes a round disk or plate 18 of slightly greater diameter than the barrel 11, and a strap or bracket 19 is secured or joined at one end to said plate. The bracket may be secured to the plate 18 by bolts 20, by rivets (not shown), or by any other suitable means.

The bracket 19 has an outer downwardly extending end portion 21 which abuts the plate 18, a substantially flat intermediate portion 22 which lies in a place substantially perpendicular to the end portion 21, and an inner end portion 23 which extends upwardly from the intermediate portion.

A clamp 24 is rigidly secured to the inner end portion 23 of the strap 19 by bolts 25 or in any other suitable manner. The side portions of the inner end portion 23 of the bracket may be turned inwardly to clasp the clamp 24 therebetween. The clamp is made of a resilient substance, such as steel, and has inwardly turned end portions 26 and 27 which are adapted to engage opposite sides of the ring 13 as the clamp is pressed on the ring. The end portions 26 and 27, of course, yield or bend as the clamp is pressed on the ring, so that the clamp is securely but detachably held on the ring for movement between the operative and inoperative positions shown in Figures 2 and 3, respectively.

Figure 3:
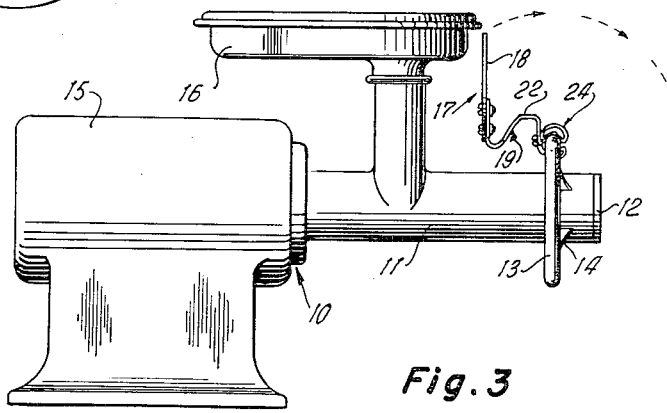
Figure 3 is a side view showing the shield in inoperative position.
Figure 2:
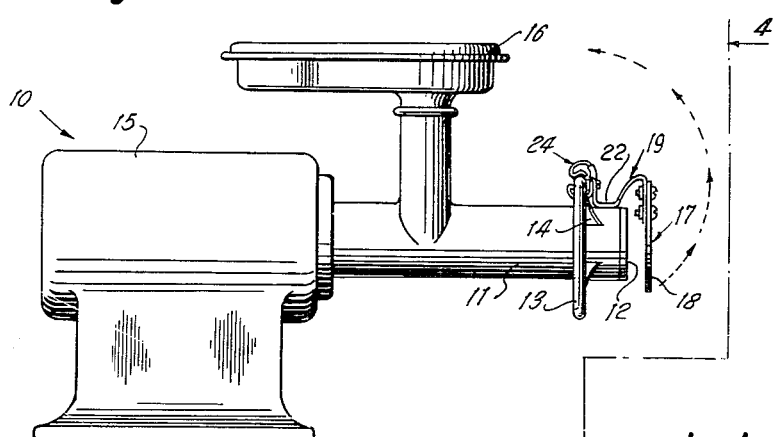
Figure 2 is a side view showing the shield attached to a grinding machine and disposed in operative position to deflect meat ejected from the outlet of the machine.

In use, the shield 17 is mounted on the machine by forcing the clamp on the ring 13 of the machine so that the ring is disposed between the inturned end portions 26 and 27 of the clamp, as shown in Figures 2 and 3, which firmly but yieldably bear against opposite sides of the ring. When the shield is in the operative position, the intermediate portion 22 of the bracket 19 abuts the barrel 11 forward of the ring 13 to hold the plate 18 in front of the outlet 12 of the barrel but spaced therefrom so that meat thrown by the machine through the outlet 12 will strike the plate 18 and then fall downwardly to a receptacle (not shown) positioned beneath the outlet 12. The plate 18 being of greater diameter than the barrel, no particles of meat ejected through the outlet 12 can pass the plate.

When it is desired to clean the outlet 12 of the barrel or to change or remove the knives positioned in the barrel, the shield 17 is swung upwardly to the position shown in Figure 3, the clamp 24 sliding around the ring 13 during such movement. When it again becomes desirable to employ the shield, it is swung back to the position shown in Figure 2. The shield may be easily detached from the grinding machine by pulling the shield outwardly from the ring, the resilient end portions 26 and 27 flexing outwardly to permit the clamp to move off the ring.

It will now be seen that a new and improved shield 17 has been illustrated and described which includes a plate 18 which is held in front of and spaced from the outlet 12 of the barrel 11 of a meat grinding machine by a strap or bracket 19. It will also be seen that the strap has an intermediate portion 22 which is adjusted to bear against the barrel to hold the plate in operative meat deflecting position opposite the outlet of the barrel, and a resilient clamp 24 which is adjusted to secure the shield detachably to a ring 13 of the machine disposed about the barrel 11 rearwardly of its outlet 12. It will also be seen that the resilient clamp 24 permits the shield to be moved readily between operative and inoperative positions.

It will be obvious that by use of the shield 17, which is easily attached to and detached from a grinding machine, large quantities of meat are saved which would otherwise be wasted due to contamination by contact with walls, floors and other objects resulting from the ejection of the meat by the machine past the receiving receptacle disposed below the outlet of the machine. It will also be obvious that the shield 17 prevents the soiling of walls, floors and other objects by meat ejected by the grinding machine. Thus, the shield effects considerable savings in lost or damaged meat, and in time and labor which would otherwise be expended in cleaning the walls, floors, and other objects after each use of the meat grinding machine.

Figure 5:
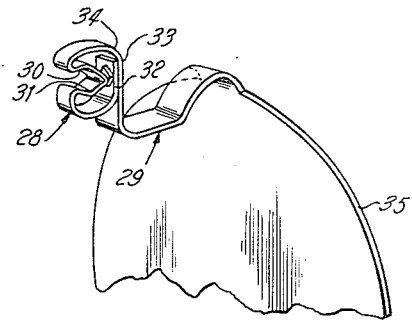
Figure 5 is an enlarged fragmentary perspective view of a modified form of the shield.
Figure 4:
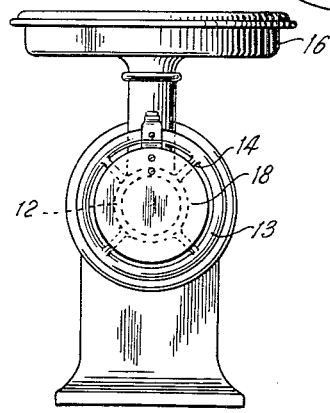
Figure 4 is an end view taken on the line 4—4 of Figure 2.

A modified form of the bracket and clamp is shown in Figure 5, wherein the clamp 28 is formed integral with the bracket 29, the inner end portion of the bracket being bent to provide the opposed sides 30 and 31 between which the ring 13 may be disposed and firmly held. The bracket 29, of course, is formed of a resilient substance, such as steel, so that the opposed sides may flex inwardly as the clamp is secured to or removed from the ring 13. The end 32 of the strap 29 may be fastened to the upright portion 33 thereof by a bolt 34. The bracket 29 may be integral with the plate 35, or it may be a separate element which is secured to the plate by bolts or rivets as in the form of the shield shown in Figures 1 to 4.

The foregoing description of the invention is explanatory only, and changes in the details of the constructions illustrated may be made by those skilled in the art, within the scope of the appended claims, without departing from the spirit of the invention.

What I claim and desire to secure by Letter Patent is:

1. A shield for use on a meat grinding machine having a barrel provided with an outlet through which meat is ejected and a ring disposed about said barrel rearwardly of said outlet including: a plate; a bracket having one end portion secured to said plate and having the other end provided with a clamp, said clamp having a pair of opposed angular resilient gripping members adapted to resiliently frictionally grip the ring for detachably and movably securing said shield to said ring whereby said plate may be moved between an operative position and an inoperative position while said shield is secured to said ring, said clamp having an intermediate portion, said intermediate portion being perpendicular to said plate and disposed relatively nearer the center of the plate than is the clamp and being adapted to abut said barrel to hold said plate in front of and in spaced relation to said outlet to deflect said meat ejected from said outlet when in operative position, said plate being disposed outwardly of said barrel and remote from said outlet whereby said outlet is unobstructed by said shield when said shield is in operative position.

2. A shield of the type described comprising: a plate; a bracket having one end portion rigidly joined to said plate adjacent an edge thereof, said bracket having a clamp secured to its other opposite end portion, said clamp being formed with a pair of opposed angular resilient gripping members by which said plate is adapted to be movably secured to a fixed member of a meat grinding machine, said bracket having an intermediate portion extending substantially perpendicularly to said one end portion joined to said plate and disposed relatively nearer the center of said plate than is the clamp, said intermediate portion being adapted to abut the barrel of the grinding machine to hold said plate in front of and in spaced relation to the outlet of the barrel to deflect meat ejected from the outlet.

3. A shield for use on a meat grinding machine having a barrel provided with an outlet through which meat is ejected and a ring disposed about and spaced from said barrel rearwardly of said outlet, said shield including: a plate; a bracket rigidly joined at one end to said plate adjacent the edge thereof and extending from the edge toward the center of said plate in a direction away from the plane of said plate, said bracket having an intermediate stop portion disposed substantially perpendicular to the plane of the plate and inwardly from the edge toward the center of the plate, said bracket having a portion extending outwardly from said intermediate stop portion to its other end and provided at said other end with a clamp, said clamp being formed with a pair of opposed angular resilient gripping members adapted to resiliently frictionally grip said ring to detachably and movably secure said plate to said ring whereby said plate may be moved between an operative position and an inoperative position while so secured to said ring; said intermediate stop portion of said bracket being adapted to abut the barrel of said grinding machine to stop swinging movement of said shield on said ring and to position said plate in operative position in alignment with and spaced outwardly from the outlet from said barrel, said plate being larger in lateral dimensions than said outlet whereby meat ejected through the outlet when said plate is in such operative position may not pass said plate; said resilient gripping members permitting said plate to be swung from operative position to an inoperative position out of alignment with said outlet, their frictional resilient grip on said ring providing for movably holding said plate in said inoperative position.

References Cited in the file of this patent

UNITED STATES PATENTS

| 1,281,198 | Opfer | Oct. 8, 1918 |
| 1,289,765 | Hood | Dec. 31, 1918 |
| 2,262,605 | Glaz | Nov. 11, 1941 |
| 2,603,896 | Bennett | July 22, 1952 |

FOREIGN PATENTS

| 366,055 | Germany | Dec. 27, 1922 |